United States Patent
Wang et al.

(10) Patent No.: US 11,987,132 B2
(45) Date of Patent: May 21, 2024

(54) LINEAR TIME VARYING MODEL PREDICTIVE TORQUE CONTROL

(71) Applicant: GM Global Technology Operations LLC, Detroit, MI (US)

(72) Inventors: Yue-Yun Wang, Troy, MI (US); Lei Hao, Troy, MI (US); Suresh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 625 days.

(21) Appl. No.: 17/145,598

(22) Filed: Jan. 11, 2021

(65) Prior Publication Data
US 2022/0219548 A1 Jul. 14, 2022

(51) Int. Cl.
*B60L 15/20* (2006.01)
*B60L 50/51* (2019.01)

(52) U.S. Cl.
CPC ............... *B60L 15/20* (2013.01); *B60L 50/51* (2019.02); *B60L 2210/42* (2013.01); *B60L 2240/423* (2013.01); *B60L 2240/427* (2013.01); *B60L 2240/429* (2013.01)

(58) Field of Classification Search
CPC ...... B60L 15/20; B60L 50/51; B60L 2210/42; B60L 2240/423; B60L 2240/427; B60L 2240/429
See application file for complete search history.

(56) References Cited

U.S. PATENT DOCUMENTS

| | | | |
|---|---|---|---|
| 2005/0007044 A1* | 1/2005 | Qiu | G05B 13/048 318/717 |
| 2006/0006825 A1* | 1/2006 | Inaguma | H02P 21/22 318/807 |
| 2011/0248663 A1* | 10/2011 | Yamakawa | B60L 50/13 318/805 |
| 2016/0059735 A1* | 3/2016 | Vovos | B60L 50/62 701/22 |
| 2016/0226414 A1* | 8/2016 | Wang | H02P 21/18 |
| 2016/0226419 A1* | 8/2016 | Wang | H02P 21/24 |
| 2018/0026573 A1* | 1/2018 | Akashi | H02P 21/13 318/6 |
| 2018/0112616 A1* | 4/2018 | Wang | F02D 43/04 |
| 2018/0328299 A1* | 11/2018 | Wang | F02D 35/023 |
| 2018/0356819 A1* | 12/2018 | Mahabadi | B60W 30/08 |
| 2020/0280276 A1* | 9/2020 | Thyagarajan | H02P 21/13 |
| 2020/0409320 A1* | 12/2020 | El Shormbably | H02P 23/0077 |

* cited by examiner

*Primary Examiner* — James J Lee
*Assistant Examiner* — Wenyuan Yang
(74) *Attorney, Agent, or Firm* — Vivacqua Crane, PLLC

(57) ABSTRACT

A system for torque control of an electric motor in a motor vehicle includes a power inverter that delivers a current to the electric motor to regulate the torque of the electric motor and a model predictive control module that sends a three-phase voltage to the power inverter to control the operation of the power inverter.

20 Claims, 5 Drawing Sheets

LINEAR TIME VARYING MODEL PREDICTIVE TORQUE CONTROL

INTRODUCTION

The present disclosure relates to electric motors. More specifically, the present disclosure relates to torque control of electric motors for motor vehicles.

Many motor vehicles utilize electric motors. In particular, hybrid motor vehicles utilize one or more electric motors in addition to an internal combustion, and electric vehicles utilize one or more electric motors as the primary power plant.

Operation of these electric motors requires the control of the torque output of the motors. Currently, torque control of electric motors is based on an open-loop system. Such systems require significant calibration of numerous look-up tables to achieve robust performance of the motor vehicles.

Thus, while current electric motor torque control systems achieve their intended purpose, there is a need for a new and improved systems to regulate the torque output of electric motors.

SUMMARY

According to several aspects, a system for torque control of an electric motor in a motor vehicle includes a power inverter that delivers a current to the electric motor to regulate the torque of the electric motor and a model predictive control (MPC) module that sends a three-phase voltage to the power inverter to control the operation of the power inverter.

In an additional aspect of the present disclosure, the MPC module is based on a linear time varying model of the motor at each sample time.

In another aspect of the present disclosure, the MPC module is based on a linear parameter varying model within the MPC control horizon.

In another aspect of the present disclosure, the MPC module utilizes flux feedback from a Kalman filter.

In another aspect of the present disclosure, the MPC module utilizes current feedback.

In another aspect of the present disclosure, the system further includes a Kalman filter to estimate currents to remove noises from current measurements at selected motor operating conditions.

In another aspect of the present disclosure, the system further includes a torque sensor that measure the torque of the electric motor.

In another aspect of the present disclosure, the system further includes a Kalman filter that estimates a flux or currents for the MPC module based on voltages from the electric motor and the measured torque of the electric motor.

In another aspect of the present disclosure, the MPC module is based on a two-loop control architecture.

In another aspect of the present disclosure, the two-loop control architecture includes an inner loop that controls the currents to the electric motor.

In another aspect of the present disclosure, the two-loop architecture includes an outer loop that is based on torque feedback from the electric motor.

According to several aspects, a system for torque control of an electric motor in a motor vehicle includes a power inverter that delivers a current to the electric motor to regulate the torque of the electric motor and a model predictive control (MPC) module that sends a three-phase voltage to the power inverter to control the operation of the power inverter. The MPC module is based on a linear time varying model or a linear parameter varying model.

In another aspect of the present disclosure, the MPC module utilizes flux feedback from a Kalman filter.

In another aspect of the present disclosure, the MPC module utilizes current feedback, the system further comprising a Kalman filter to estimate currents to remove noises from current measurements at selected motor operating conditions.

In another aspect of the present disclosure, the system further includes a torque sensor that measure the torque of the electric motor.

In another aspect of the present disclosure, the system further includes a Kalman filter that estimates a flux or currents for the MPC module based on voltages from the electric motor and the measured torque of the electric motor.

In another aspect of the present disclosure, the MPC module is based on a two-loop control architecture.

In another aspect of the present disclosure, the two-loop control architecture includes an inner loop that controls the currents to the electric motor.

In another aspect of the present disclosure, the two-loop architecture includes an outer loop that is based on torque feedback from the electric motor.

According to several aspects, a system for torque control of an electric motor in a motor vehicle includes a power inverter that delivers a three-phase AC current to the electric motor to regulate the torque of the electric motor; a battery pack that applies a DC voltage to the power inverter, and a model predictive control (MPC) module that sends a three-phase voltage to the power inverter to control the operation of the power inverter. The MPC module is based on a linear time varying model or a linear parameter varying model.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
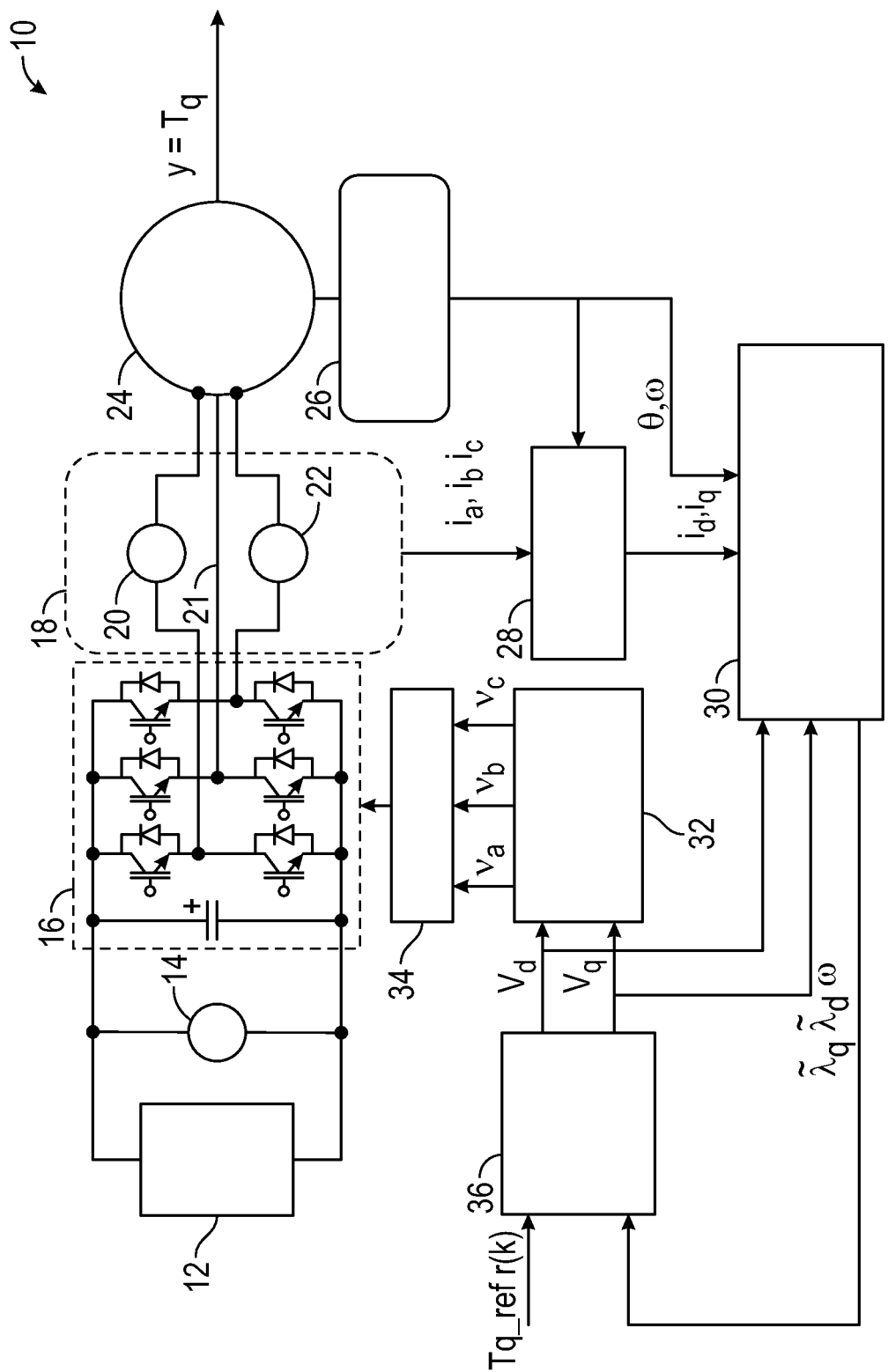
FIG. 1A is a schematic illustration of a system for torque control of a motor according to an exemplary embodiment.
Figure 1B:
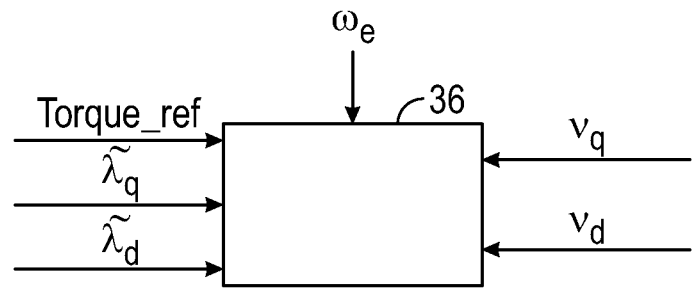
FIG. 1B is a schematic illustration of subcomponent of the system shown in FIG. 1A.
Figure 1C:
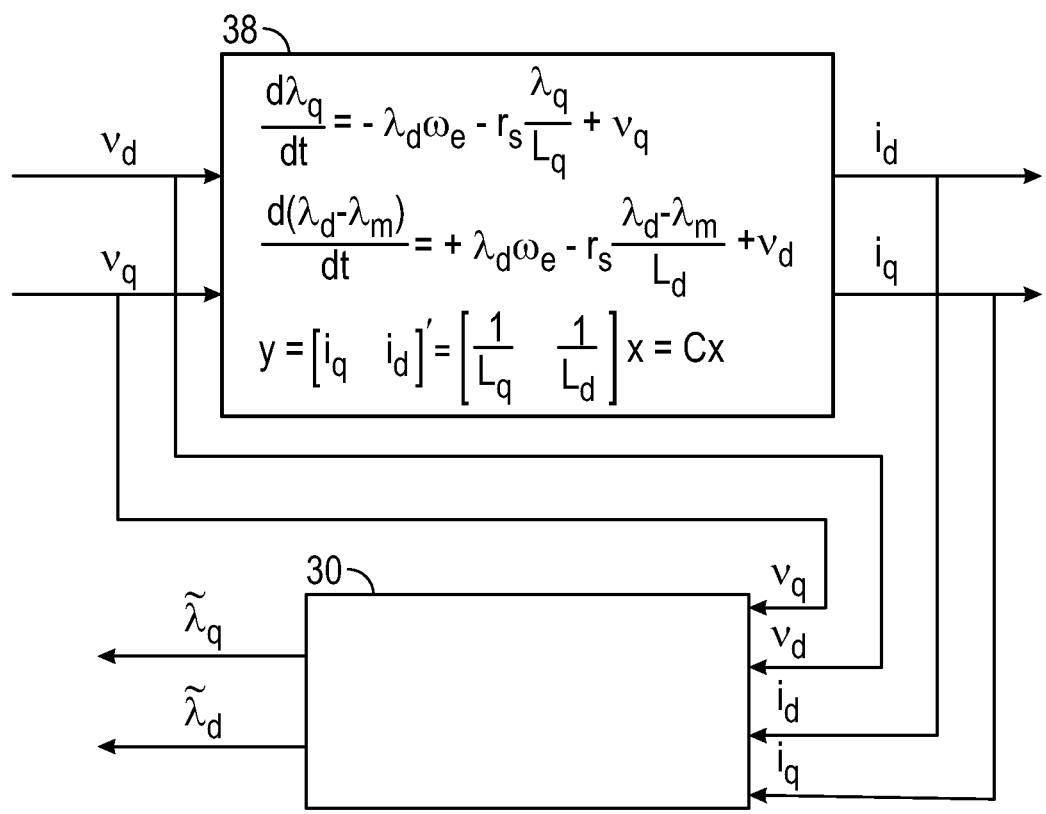
FIG. 1C is a schematic illustration of a Kalman filer utilized in the system shown in FIG. 1A.

Referring to FIGS. 1A, 1B and 1C, there is shown a system 10 for control of a torque ($T_q$) of an AC electric motor 24. The system 10 includes a battery pack 12 that provides a voltage 14 to a power inverter 16. The power inverter, in turn, provides a three-phase current 20, 21 and 22 to the electric motor 24.

The system 10 further includes a model predictive control module (MPC) 36 that regulates the currents transmitted from the power inverter 16 to the electric motor 24, for example, a three-phase AC machine. In some arrangements, the MPC 36 is linear time varying (LTV), that is, the motor system model parameters are time varying. In other arrangements, the system model parameters are linear parameter varying (LPV), that is, some of the system parameters vary slowly. The electric motor 24 is a permanent magnet (PM) machine, also referred to as a permanent magnet asynchronous machine (PMSM).

For reference, the following nomenclature is utilized in the present disclosure—r(k): control reference at sample time k; Tq_ref: motor torque reference or command, r(k) =Tq_ref; $v_a$, $v_b$ and $v_c$: three phase voltage applied to the electric motor 24 for torque control; $i_a$, $i_b$, $i_c$ three phase current of the electric motor 24; θ, ω: electric motor rotor position and motor speed; motor speed calculated as $\omega_e$, electrical motor speed, and $\omega_m$, mechanic motor speed or physical rotating speed, that are related by the expression $\omega_e$=p/2$\omega_m$, where p is the number of magnet poles in motor; Tq: motor torque; $i_d$, $i_q$: motor currents in the rotor rotating reference frame (these two currents are perpendicular in the magnetic field); $V_d$, $V_q$: motor voltages in the rotor rotating reference frame (these voltages are perpendicular in the magnetic field and are also referred to as direct voltage and quadrature voltage); phase transformation (θ) transforms the rotating reference frame currents or voltages to three phase currents or voltages and vice versa; $\lambda_d, \lambda_q$: motor flux in rotating reference frame; $\tilde{\lambda}_q \tilde{\lambda}_d$: adding tilt means estimated motor flux.

The MPC 36 generates a desired motor control voltages Vd, Vq based on the commanded motor torque (or reference torque), Tq_ref, the motor speed and motor flux feedback, as estimated by a sensor 26 and sensors that measure three-phase currents. Employing phase transformation (θ) 32, the optimal control Vd and Vq are transformed to the desired three phase voltages va, vb and vc applied to the electric motor 24. Based on the desired three phase voltages va, vb and vc space vector modulation or PWM 34 is applied to the control inverter switches 16 to generate the desired three phase currents 20, 21 and 22 to the electric motor 24 that produces the desired torque $T_q$. As such, the system 10 utilizes model predictive control of motor torque using flux feedback.

The MPC 26 utilizes an optimization algorithm to obtain the desired voltages Vd and Vq in order to control the desired torque $T_q$. The control objective is to minimize a cost function (1) at a predictive time horizon with number of N samples.

$$\min_{vi} \sum_{i=k}^{k+N} W^y (Tq(i) - r(i))^2 + \quad (1)$$

$$\|W^u(v_i - v_{ref}(i))\|^2 + \|W^{\Delta u}\Delta v_i\| \text{ where } v_i = [\,v_d(i) \quad v_q(i)\,]$$

In this cost function, i indicates discrete sample time at ith sample step, Tq(i) is the torque at sample time i. r(i) is the torque control reference at sample time i, k is the current sample time, $v_{ref}(i)$ is Vd and Vq reference commands, which are set to zero, $\Delta v_i$ is the rate of change of Vd and Vq, $W^y$, $W^u$, $W^{\Delta u}$ are the tunable weighting functions, and ||*|| denotes vector norm.

Tuning the weights balances the fast torque tracking responses and the control input energy and aggressiveness of control inputs by the rate limit. The algorithm solves the optimal control Vd and Vq that minimizes the cost function (1) to achieve desired torque tracking control. The solution of this optimization controller is subject to the motor dynamic responses characterized by the motor flux state space equation:

$$\frac{d\lambda_q}{dt} = -\lambda_d \omega_e - r_s \frac{\lambda_q}{L_q} + v_q \quad (2)$$

$$\frac{d\lambda_d}{dt} = +\lambda_q \omega_e - r_s \frac{\lambda_d - \lambda_m}{L_d} + v_d$$

$$T_q = \frac{3}{2} P\left(\lambda_d \lambda_q \left[\frac{1}{L_q} - \frac{1}{L_d}\right] + \frac{\lambda_q \lambda_m}{L_d}\right)$$

The optimization is also subject to torque, maximum inverter voltage and current and temperature constraint:

$$T_{q,min}(\omega_m) < T_q < T_{q,max}(\omega_m)$$

$$V_s = \sqrt{(v_d)^2 + (v_q)^2} \leq V_{max}$$

$$I_s = \sqrt{(i_d)^2 + (i_q)^2} \leq I_{max}$$

$$T_{m,min} < T_m < T_{m,max} \quad (3)$$

In equation (2), $r_s$ is the stator winding resistance, Ld and Lq are motor inductances, which are nonlinear functions of id and iq. The motor dynamic equation is linear time varying ($\omega_e(t)$, $L_q(i_d(t), i_q(t))$, $L_d(i_d(t), i_q(t))$), where $\lambda_m$: the mechanical linkage flux, considered as a constant; $V_{max}$: maximum inverter voltage limit; $I_{max}$: maximum inverter current limit; $T_{q,min}(\omega_m)$: minimum torque limit as a function of motor speed; and $T_{q,max}(\omega_m)$: maximum torque limit as a function of motor speed (typical torque limit is in the flux weakening range as motor speed exceeds a certain limit, the motor torque reduces as a function of speed); and $T_{m,min} < T_m < T_{m,max}$, motor temperature and min max limits.

Since the computer and optimization control executes at discrete sampling times for a linear system, the motor differential equation is linearized and discretized at each sample time over the predictive time window horizon to define a linear time varying model predictive control (LTV/MPC) for the MPC 36. The linearized motor discrete state space equation at each sample time I is $$\tilde{\lambda}(i+1) = \tilde{A}\tilde{\lambda}(i) + \tilde{B}_u \tilde{v}i$$

$$\tilde{y}(i) = G\tilde{\lambda}(i) + H\tilde{v}i$$

$$\tilde{\lambda}(i) = [\tilde{\lambda}d(i) \; \tilde{\lambda}q\,(i)]$$

The resultant MPC 26 is a state feedback of flux estimates $\tilde{v}i = f(\tilde{\lambda}_q, \tilde{\lambda}_d)$. Since the flux is not directly measurable, a Kalman filter 30 is applied to estimate the motor flux for feedback control based on the voltage command Vd and Vq and the measured current id and id from a phase transformation (θ) 28, as shown in greater detail in FIG. 1C.

Figure 2:
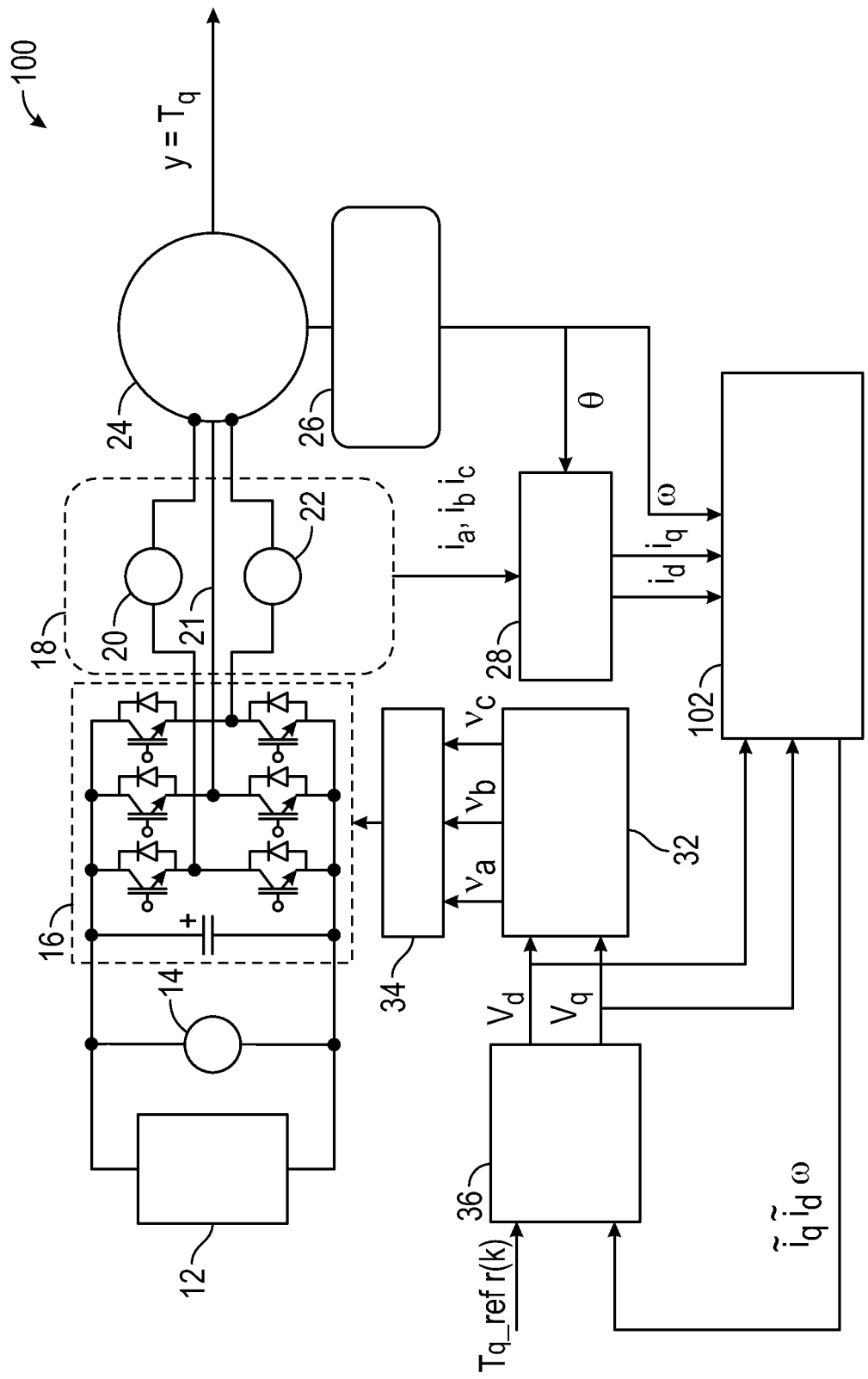
FIG. 2 is a schematic illustration of another system for torque control of a motor according to an exemplary embodiment.

Turning now to FIG. 2, there is shown an alternative system 100 for control of a torque ($T_q$) of the AC electric motor 24. Here, the MPC 36 utilizes direct current feedback 102. Since the currents id and iq are transformed 28 from three phase currents ia, ib, and ic, they are directly measurable. Options include utilizing direct current feedback without a Kalman filter or with a Kalman filter to estimate currents to remove noises from current measurements. The motor state space equations are now described by id and iq currents with the set of equations:

$$L_q \frac{di_q}{dt} = -L_d i_d \omega_e - \lambda_m \omega_e - r_s i_q + v_q \quad (4)$$

$$L_d \frac{di_d}{dt} = L_q i_q \omega_e - r_s i_d + v_d$$

$$T_q = \frac{3}{2} P(\lambda_m i_q - (L_q - L_d) i_q i_d)$$

$$T_{e,min} < T_e < T_{e,max}$$

$$V_s = \sqrt{(v_d)^2 + (v_q)^2} \le V_{max}$$

$$I_s = \sqrt{(i_d)^2 + (i_q)^2} \le I_{max}$$

$$T_{m,min} < T_m < T_{m,max}$$

where the output equation for the current observer is y=[$i_d$ $i_d$]'.

Figure 3:
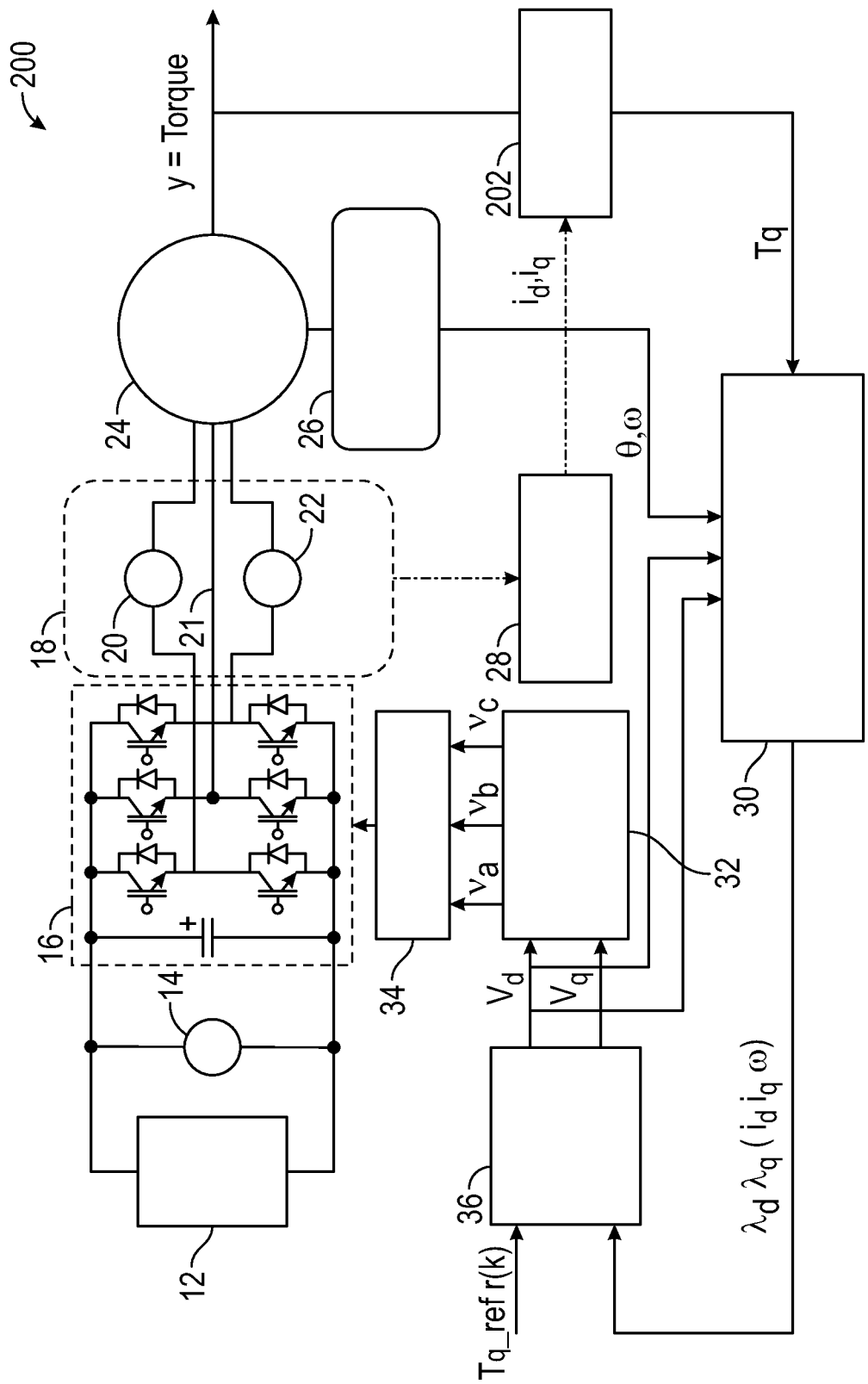
FIG. 3 is a schematic illustration of yet another system for torque control of a motor according to an exemplary embodiment.

Turning now to FIG. 3, there is shown another system 200 for control of a torque ($T_q$) of the AC electric motor 24. This system utilizes a torque sensor or virtual torque sensor 202 for direct torque feedback control. As such, all three phase current measurements are eliminated. The algorithms employed in the system 200 is similar to that employed in the systems 10 or 100 described above. The Kalman filter, however, is different. When utilizing direct toque sensor feedback, the Kalman filter estimates the flux or currents for MPC feedback based on Vd and Vq commands and the measured motor torque instead of measured id and iq currents.

Figure 4:
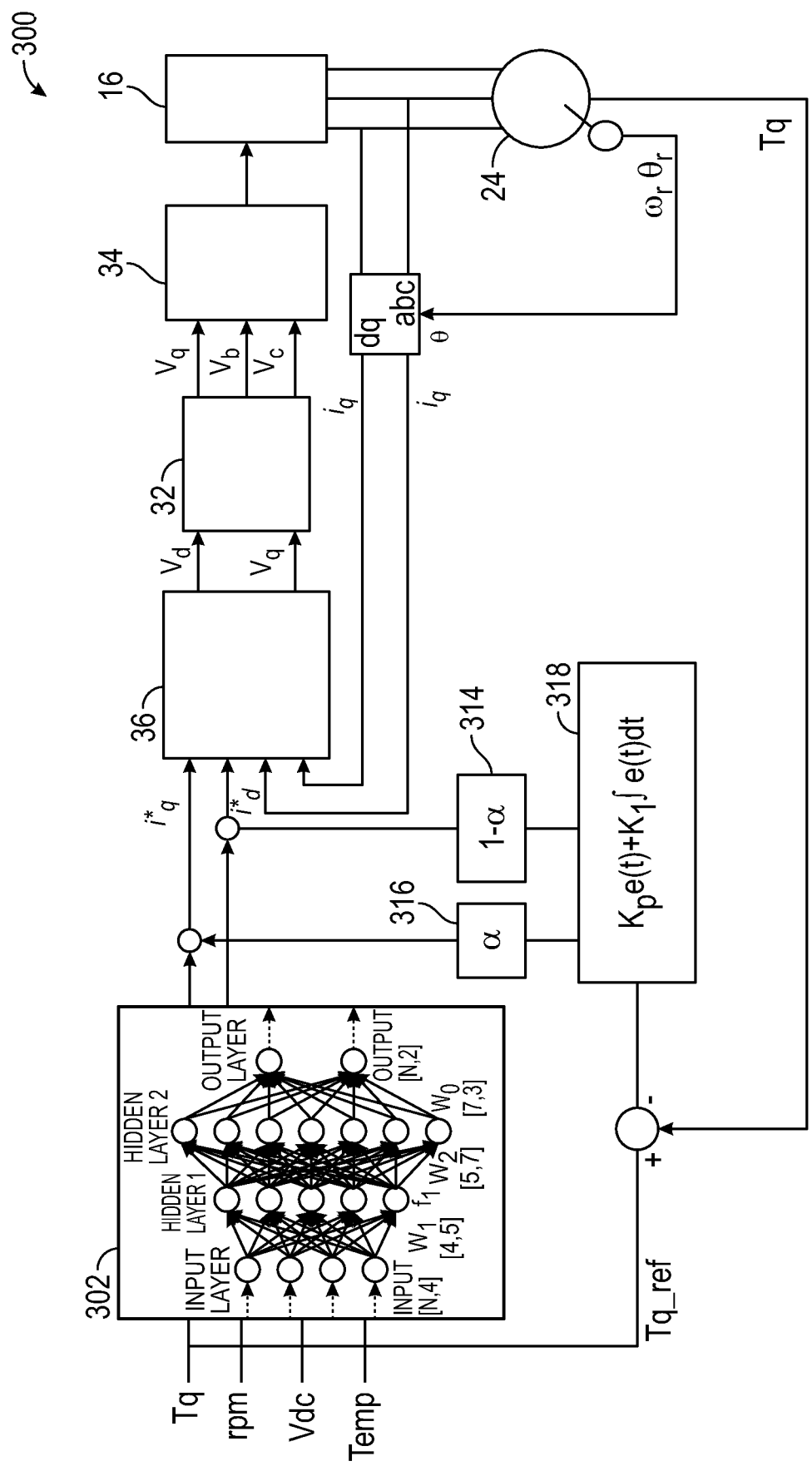
FIG. 4 is a schematic illustration of yet another system for torque control of a motor according to an exemplary embodiment.

Referring now to FIG. 4, there is shown yet another system 300 for control of a torque ($T_q$) of the AC electric motor 24. The system 300 includes two-loops: an inner loop controls the id, iq currents and an outer-loop provides torque feedback control. A deep learning neural network (NNT) 302 generates desired current commands id* and iq* for the electric motor 24 based on the desired motor torque (Tq), motor speed (rpm), battery voltage (Vdc) and motor temperature (Temp) as inputs to the NNT 302. Then the inner-loop MPC 36 controls the id and iq currents to track the current commands id* and iq*.

The MPC 36 minimizes a cost function:

$$\min_v \sum_{k=t}^{t+N} \|W^y(I_k - r(k))\|^2 + \|W^u(v_k - v_{ref}(k))\|^2 + \|W^{\Delta u}\Delta v_k\|$$

$$v_k = [\ v_d(k) \quad v_q(k)\ ], I_k = [\ i_d(k) \quad i_q(k)\ ], r(k) = [\ id*(k) \quad iq*(k)\ ]$$

where k indicates sample time at k. this optimization is to find optimal control Vd and Vq such that id and iq can track the commanded id* and iq* based on the motor dynamic equation (4) described above. The outer-loop torque control is achieved by comparing the actual torque measurement and torque command. The torque tracking errors are modulated through a PID controller 318 that modifies id* and iq* commands for better torque tracking, where α<1 316 and (1−α) 314 allocates PID modulations to modify individual id* and iq* commands.

An electric motor torque control systems of the present disclosure offers several advantages. These include reduce calibration times and the potential to eliminate one or more sensors utilized in the operation of electric motors.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for torque control of an electric motor in a motor vehicle, the system comprising:
   a power inverter that delivers a current to the electric motor to regulate the torque of the electric motor; and
   a model predictive control (MPC) module that sends a three-phase voltage to the power inverter to control the operation of the power inverter, wherein the MPC module minimizes a cost function to find optimal control motor voltages, and wherein the MPC module includes:
   a deep learning neural network that generates desired current commands based on a desired motor torque, motor speed, battery voltage, and motor temperature;
   an inner loop that controls the current to the electric motor based on the desired current commands generated by the deep learning neural network; and
   an outer loop that provides torque feedback control to the electric motor.

2. The system of claim 1, wherein the MPC module is based on a linear time varying model of the motor at each sample time.

3. The system of claim 1, wherein the MPC module is based on a linear parameter varying model within the MPC control horizon.

4. The system of claim 1, wherein the cost function is expressed as:

$$\min_v \sum_{k=t}^{t+N} \|W^y(I_k - r(k))\|^2 + \|W^u(v_k - v_{ref}(k))\|^2 + \|W^{\Delta u}\Delta v_k\|$$

wherein $W^y$, $W^u$, and $W^{\Delta u}$ represent tunable weighting functions, $I_k$ represents inverter current at a sample time k, r(k) is a control reference at the sample time k, $v_k$ represents voltage at the sample time k, and $v_{ref}$(k) represents voltage reference commands.

5. The system of claim 1, wherein the outer loop achieves the torque control by comparing an actual torque measurement and a torque command to determine a torque tracking error.

6. The system of claim 1, further comprising a (proportional-integral-derivative) PID controller in electronic communication with the MPC module.

7. The system of claim 6, wherein the PID controller modifies the desired current commands.

8. The system of claim 6, wherein the PID controller modulates torque tracking errors.

9. The system of claim 1, further comprising a battery pack that applies a DC voltage to the power inverter.

10. A system for torque control of an electric motor in a motor vehicle, the system comprising:
    a power inverter that delivers a current to the electric motor to regulate the torque of the electric motor; and
    a model predictive control (MPC) module that sends a three-phase voltage to the power inverter to control the operation of the power inverter,
    wherein the MPC module is based on a linear time varying model or a linear parameter varying model, and wherein the MPC module minimizes a cost function to find optimal control motor voltages, and wherein the MPC module includes:
a deep learning neural network that generates desired current commands based on a desired motor torque, motor speed, battery voltage, and motor temperature;
an inner loop that controls the current to the electric motor based on the desired current commands generated by the deep learning neural network; and
an outer loop that provides torque feedback control to the electric motor.

11. The system of claim 10, wherein the cost function is expressed as:

$$\min_{v} \sum_{k=t}^{t+N} \|W^y(I_k - r(k))\|^2 + \|W^u(v_k - v_{ref}(k))\|^2 + \|W^{\Delta u}\Delta v_k\|$$

wherein $W^y$, $W^u$, and $W^{\Delta u}$ represent tunable weighting functions, $I_k$ represents inverter current at a sample time k, r(k) is a control reference at the sample time k, $v_k$ represents voltage at the sample time k, and $v_{ref}(k)$ represents voltage reference commands.

12. The system of claim 10, wherein the outer loop achieves the torque control by comparing an actual torque measurement and a torque command to determine a torque tracking error.

13. The system of claim 10, further comprising a (proportional-integral-derivative) PID controller in electronic communication with the MPC module.

14. The system of claim 13, wherein the PID controller modifies the desired current commands.

15. The system of claim 10, further comprising a battery pack that applies a DC voltage to the power inverter.

16. A system for torque control of an electric motor in a motor vehicle, the system comprising:
a power inverter that delivers a three-phase AC current to the electric motor to regulate the torque of the electric motor;
a battery pack that applies a DC voltage to the power inverter; and
a model predictive control (MPC) module that sends a three-phase voltage to the power inverter to control the operation of the power inverter,
wherein the MPC module is based on a linear time varying model or a linear parameter varying model, and wherein the MPC module minimizes a cost function to find optimal control motor voltages, and wherein the MPC module includes:
a deep learning neural network that generates desired current commands based on a desired motor torque, motor speed, battery voltage, and motor temperature;
an inner loop that controls the current to the electric motor based on the desired current commands generated by the deep learning neural network; and
an outer loop that provides torque feedback control to the electric motor.

17. The system of claim 16, wherein the cost function is expressed as:

$$\min_{v} \sum_{k=t}^{t+N} \|W^y(I_k - r(k))\|^2 + \|W^u(v_k - v_{ref}(k))\|^2 + \|W^{\Delta u}\Delta v_k\|$$

wherein $W^y$, $W^u$, and $W^{\Delta u}$ represent tunable weighting functions, $I_k$ represents inverter current at a sample time k, r(k) is a control reference at the sample time k, $v_k$ represents voltage at the sample time k, and $v_{ref}(k)$ represents voltage reference commands.

18. The system of claim 16, wherein the outer loop achieves the torque control by comparing an actual torque measurement and a torque command to determine a torque tracking error.

19. The system of claim 16, further comprising a (proportional-integral-derivative) PID controller in electronic communication with the MPC module.

20. The system of claim 19, wherein the PID controller modifies the desired current commands.

* * * * *